United States Patent
Sreenivasagaperumal et al.

(10) Patent No.: US 10,742,545 B2
(45) Date of Patent: Aug. 11, 2020

(54) MULTICASTING SYSTEM

(71) Applicant: Dell Products L.P., Round Rock, TX (US)

(72) Inventors: Damodharan Sreenivasagaperumal, Tamil Nadu (IN); Balaji Venkat Venkataswami, Tamil Nadu (IN); Pradeep Raju, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 15/916,601

(22) Filed: Mar. 9, 2018

(65) Prior Publication Data

US 2019/0280968 A1    Sep. 12, 2019

(51) Int. Cl.
*H04W 56/00*    (2009.01)
*H04L 12/723*   (2013.01)
*H04L 12/761*   (2013.01)
*H04L 12/937*   (2013.01)
*H04L 12/24*    (2006.01)

(52) U.S. Cl.
CPC .............. *H04L 45/50* (2013.01); *H04L 45/16* (2013.01); *H04L 41/0823* (2013.01); *H04L 49/253* (2013.01)

(58) Field of Classification Search
CPC ..... H04L 45/50; H04L 45/16; H04L 41/0823; H04L 49/253
USPC ........................................ 370/355
See application file for complete search history.

(56) References Cited

U.S. PATENT DOCUMENTS

| 6,456,597 B1* | 9/2002 | Bare ................. H04L 29/12009 370/252 |
| 10,158,558 B1* | 12/2018 | Ward ...................... H04L 45/16 |
| 2013/0100942 A1* | 4/2013 | Rudnick ............. H04B 7/2656 370/337 |
| 2013/0311626 A1* | 11/2013 | Karthikeyan ....... H04L 41/0816 709/221 |
| 2017/0033939 A1* | 2/2017 | Bragg ...................... H04L 12/18 |
| 2019/0114080 A1* | 4/2019 | Pydipaty ................ G06F 3/065 |

* cited by examiner

*Primary Examiner* — Sai Ming Chan
(74) *Attorney, Agent, or Firm* — Haynes and Boone, LLP

(57) ABSTRACT

A multicast system includes a source device and a plurality of receiver devices connected by switches that are also coupled to a switch controller. The switch controller receives source device information for the source device from its connected first switch, and receives receiver device information for each of the receiver devices from their respective connected second switches. The switch controller uses the source device information and receiver device information to construct a multicast tree that includes switches capable of transmitting multicast communications from the source device to each of the receiver devices. The switch controller then programs at least some of the switches so that a multicast data communication from the source device is segment routed to a third switch, and replicated by the third switch to produce replicated multicast data communications that are each segment routed to at least some of the receiver devices through their respective second switches.

20 Claims, 10 Drawing Sheets

MULTICASTING SYSTEM

BACKGROUND

The present disclosure relates generally to information handling systems, and more particularly to multicasting in a network of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often utilized in datacenter networks to provide for the transfer of information. In some situations, information may be transferred within datacenter networks via switch devices using group communication methods that are referred to as multicasting. Information that is multicast may be created by a source device and transmitted to multiple receiver devices, and many conventional datacenter networks rely on Protocol Independent Multicast (PIM) techniques in order to enable such multicasting. As would be understood by one of skill in the art in possession of the present disclosure, PIM is a family of multicast routing protocols for Internet Protocol (IP) networks that does not include its own topology discovery mechanism, but instead uses routing information supplied by other routing protocols (PIM is not dependent on a specific unicast routing protocol, and can make use of any unicast routing protocol in use by the network.) Furthermore, PIM does not build its own routing tables, and instead may use the unicast routing table for reverse path forwarding. However, the implementation of PIM to provide for multicasting in datacenter networks introduces a number of issues related to the complexity of PIM, which requires the creation of a multicast state in each of the switch devices/router devices that handle multicast data communications between the source device and the receiver devices. This complexity prevents multicasting functionality from being implemented in many datacenter networks that would otherwise benefit from it.

Accordingly, it would be desirable to provide an improved multicasting system.

SUMMARY

According to one embodiment, an Information Handling System (IHS) includes a processing system; and a memory system that is coupled to the processing system and that includes instructions that, when executed by the processing system, cause the processing system to provide a switch controller engine that is configured to: receive, from a first switch device that is directly connected to a source host device, source host device information that was communicated by the source host device to the first switch device; receive, from respective second switch devices that are each directly connected to a respective one of a plurality of receiver host devices, receiver host device information that was communicated by each respective receiver host device to its respective directly connected second switch device; construct, using the source host device information and each of the receiver host device information, a multicast tree that includes a plurality of switch devices that include the first switch device and the second switch device, and that are capable of transmitting multicast communications between the source host device and each of the plurality of receiver host devices; and programming at least one of the plurality of switch devices such that a multicast data communication generated by the source host device is segment routed by at least some of the plurality of switch devices to a third switch device that is included in the plurality of switch devices, and replicated by the third switch device to produce replicated multicast data communications that are each segment routed by at least some of the plurality of switch devices to at least some of the plurality of receiver host devices through their respective second switch devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
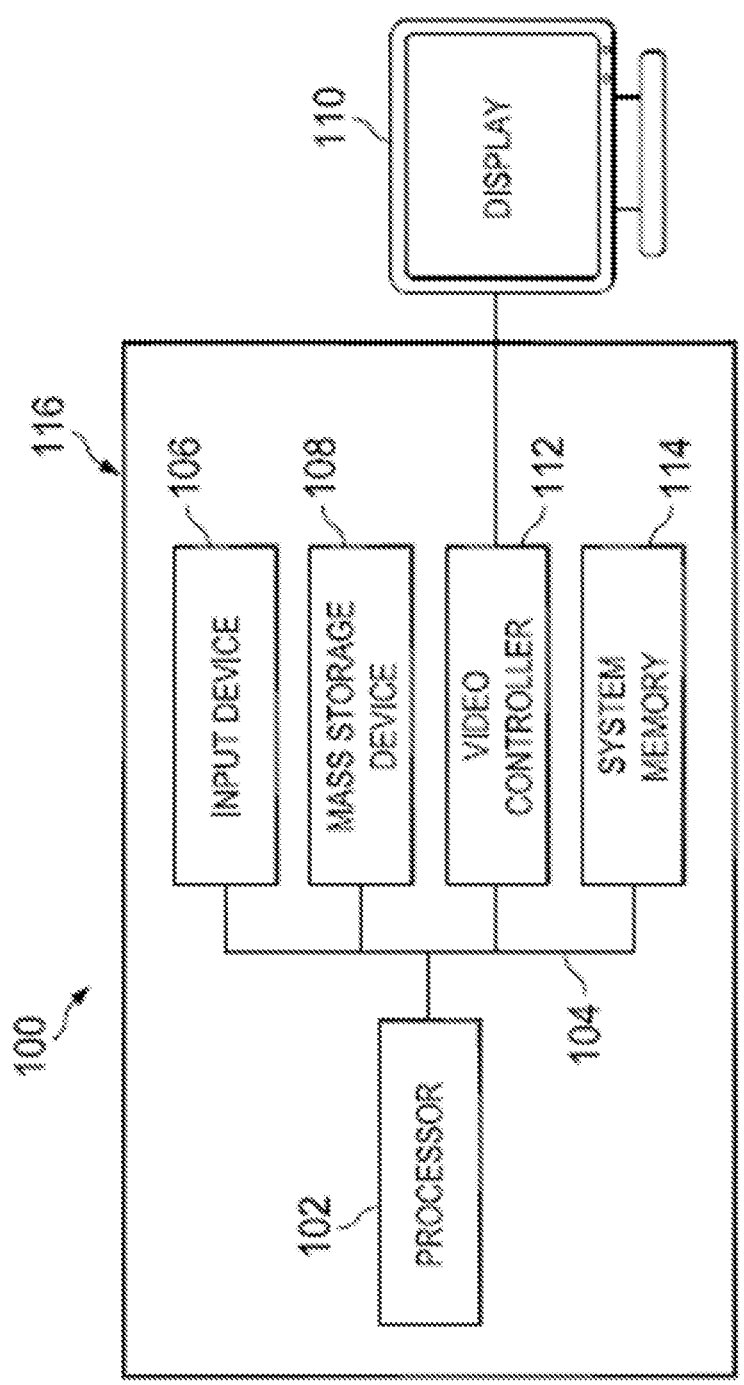
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
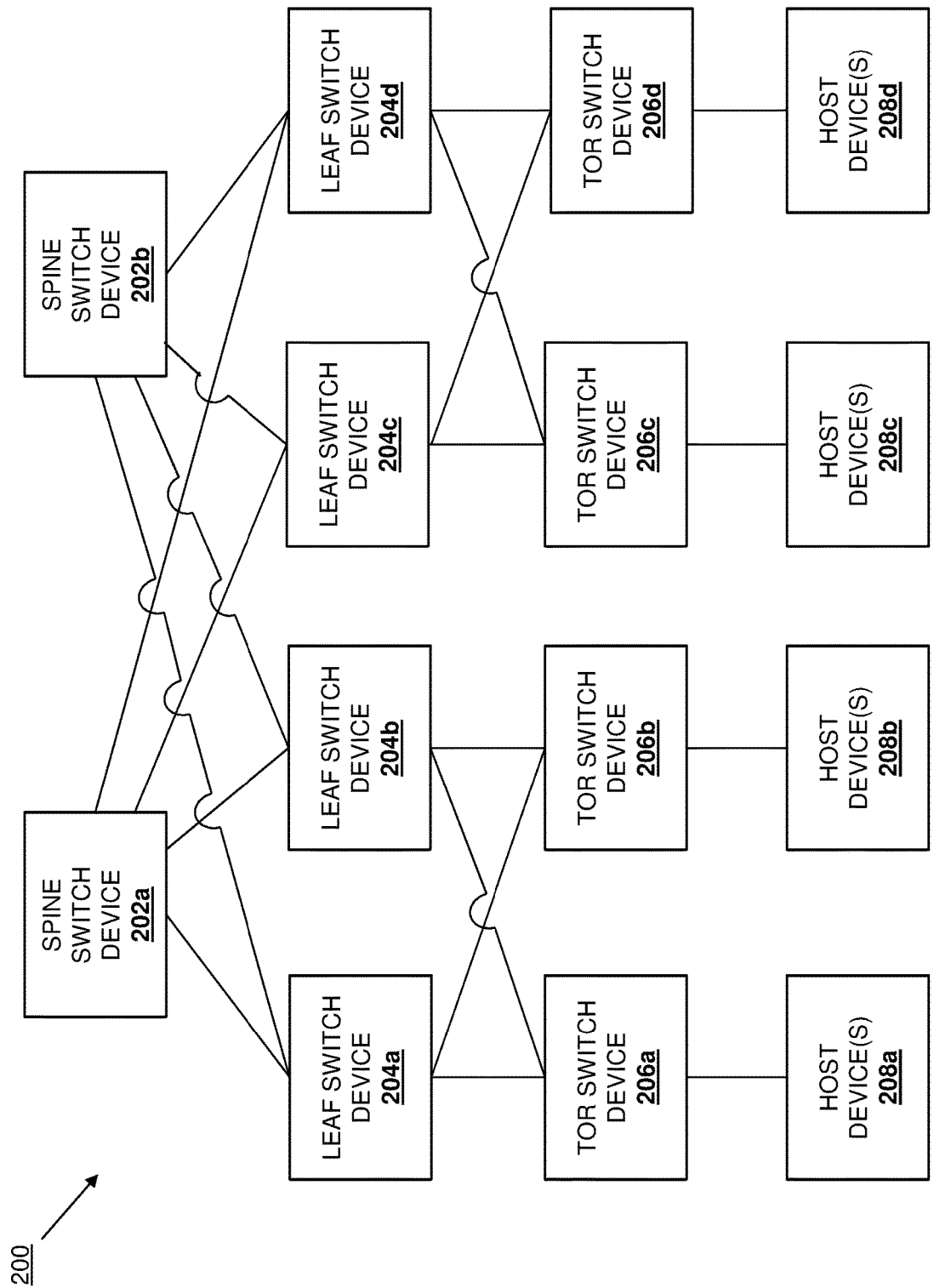
FIG. 2A is a schematic view illustrating an embodiment of a multicasting network.
Figure 2B:
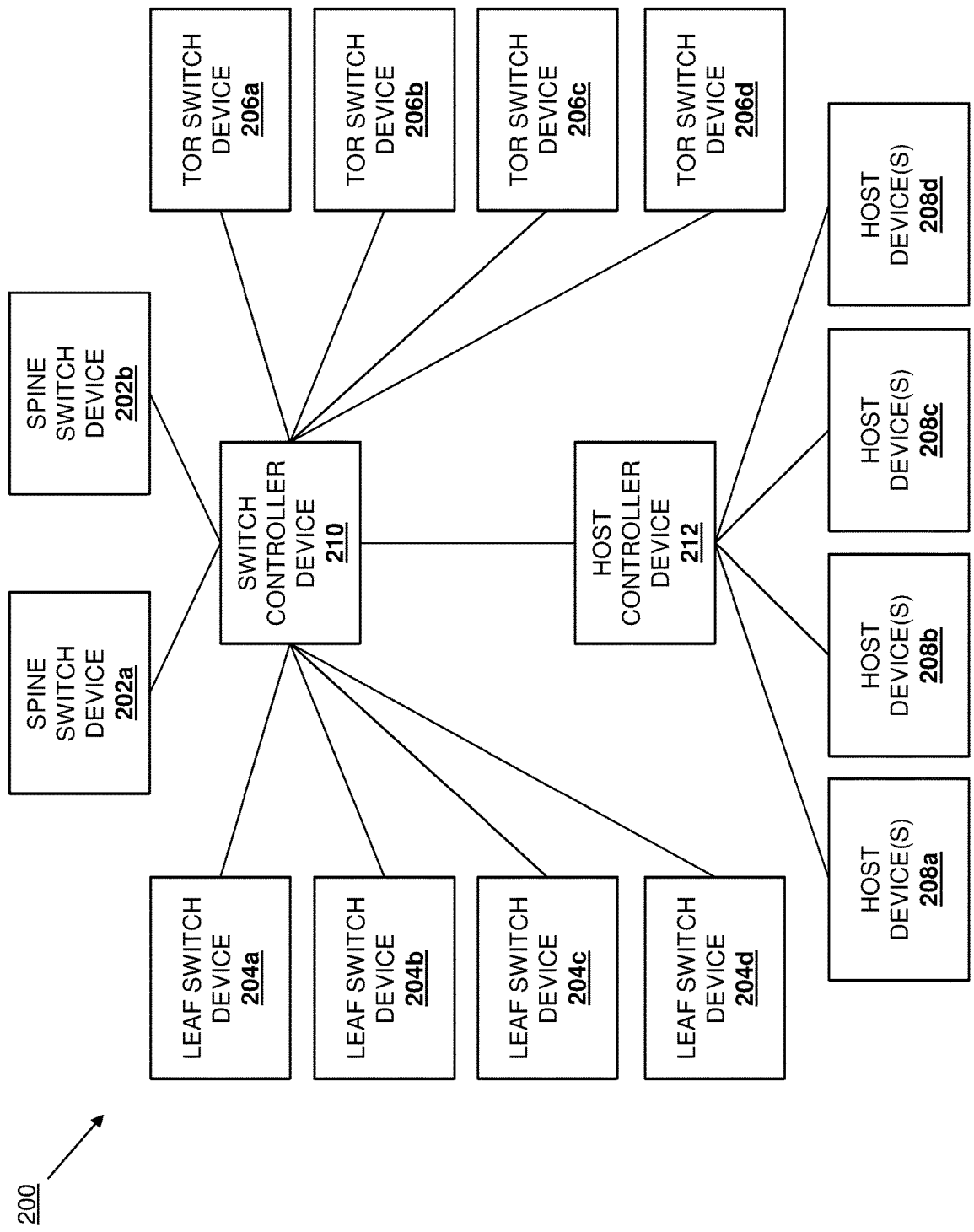
FIG. 2B is a schematic view illustrating an embodiment of the multicasting network of FIG. 2A.

Referring now to FIGS. 2A and 2B, an embodiment of a multicast network 200 is illustrated. In the illustrated embodiment, the multicast network 200 includes a plurality of spine switch devices 202a and 202b, any of which may be provided by the IHS 100 discussed above with reference to FIG. 1 and/or include the components of the IHS 100. Each of the spine switch devices 202a and 202b is coupled to each of a plurality of leaf switch devices 204a, 204b, 204c, and 204d, any of which may be provided by the IHS 100 discussed above with reference to FIG. 1 and/or include the components of the IHS 100. Each of the leaf switch devices 204a and 204b is coupled to each of a plurality of Top-Of-Rack (TOR) switch devices 206a and 206b, any of which may be provided by the IHS 100 discussed above with reference to FIG. 1 and/or include the components of the IHS 100. Each of the leaf switch devices 204c and 204d is coupled to each of a plurality of Top-Of-Rack (TOR) switch devices 206c and 206d, any of which may be provided by the IHS 100 discussed above with reference to FIG. 1 and/or include the components of the IHS 100.

While illustrated and describes below as TOR switch devices, the TOR switch devices 206a-d may be provided by a variety of Virtual Tunnel EndPoints (VTEPs) while remaining within the scope of the present disclosure. In the illustrated embodiment, the TOR switch device 206a is coupled to one or more host devices 208a, the TOR switch device 206a is coupled to one or more host devices 208a, the TOR switch device 206a is coupled to one or more host devices 208a, and the TOR switch device 206a is coupled to one or more host devices 208a. Any of the TOR switch devices 208a-d may be provided by the IHS 100 discussed above with reference to FIG. 1 and/or include the components of the IHS 100. In the embodiments discussed below, the host devices 208a-d are Virtual Machines (VMs) provided by (i.e., run on) server devices (or other physical computing devices), although other types of host devices will benefit from the teachings of the present disclosure, and thus are envisioned as falling within its scope as well.

With reference to FIG. 2B, in the illustrated embodiment, a switch controller device 210 is coupled to each of the spine switch devices 202a and 202b, the leaf switch devices 204a-d, and the TOR switch devices 206a-d. For example, the switch controller device 210 may be provided by a Software Defined Networking (SDN) controller device that is configured to utilize SDN techniques to facilitate network management and enable programmatically efficient network configuration that improves network performance and monitoring by centralizing network intelligence in the SDN controller device via the disassociation of the network packet forwarding process (i.e., the data plane) from the network process routing process (i.e., the control plane) in the switch devices. However, other types of controller devices may perform the functionality of the switch controller device 210 discussed below while remaining within the scope of the present disclosure as well. A host controller device 212 is coupled to the switch controller device 210 as well as to each of the host devices 208a-d. In the embodiments discussed below, the host controller device 212 is provided by a VM management system, although other controller devices may perform the functionality of the host controller device 210 discussed below while remaining within the scope of the present disclosure as well. One of skill in the art in possession of the present disclosure will recognize that the multicast system 200 of FIG. 2 is a simplified version of a network that is configured to provide for multicasting, and that multicast networks may include a variety of other/different devices and/or devices in different configurations while remaining within the scope of the present disclosure.

Figure 3:
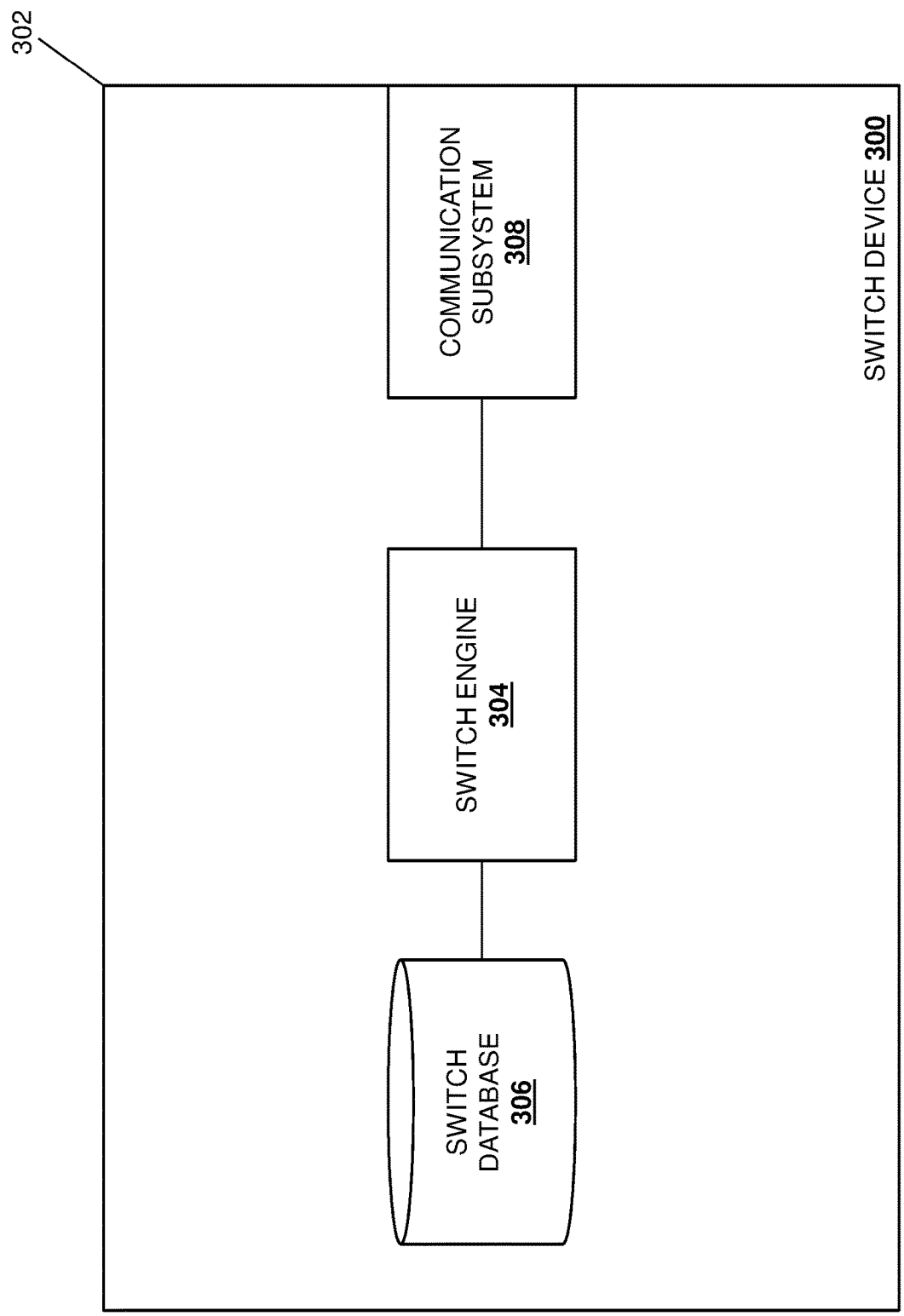
FIG. 3 is a schematic view illustrating an embodiment of a switch device included in the multicasting network of FIGS. 2A and 2B.

Referring now to FIG. 3, an embodiment of a switch device 300 is illustrated which may provide any or all of the spine switch devices 202a and 202b, the leaf switch devices 204a-d, and/or the TOR switch devices 206a-d referenced in FIGS. 2A and 2B above. As such, the switch device 300 may be the IHS 100 discussed above with reference to FIG. 1, and/or may include some or all of the components of the IHS 100. In the illustrated embodiment, the switch device 300 includes a chassis 302 that houses the components of the switch device 300, only some of which are illustrated in FIG. 3. For example, the chassis 302 may house a processing system (not illustrated, but which may include the processor 102 discussed above with reference to FIG. 1), and a memory system (not illustrated, but which may include the memory 114 discussed above with reference to FIG. 1) that is coupled to the processing system and that includes instructions that, when executed by the processing system, cause the processing system to provide a switch engine 304 that may be configured to perform the functionality of any of the switch engines and/or switch devices discussed below.

The chassis 302 may also house a storage system (not illustrated, but which may include the storage device 108 discussed above with reference to FIG. 1) that is coupled to the switch engine 304 (e.g., via a coupling between the storage system and the processing system) and that includes a switch database 306 that may store any of the information utilized to provide the functionality discussed below. The chassis 302 may also house a communication subsystem 308 that is coupled to the switch engine 304 (e.g., via a coupling between the communication subsystem 308 and the processing system) and that may include a Network Interface Controller (NIC), a wireless communication subsystem (e.g., a BLUETOOTH communication subsystem, a Near Field Communication (NFC) subsystem, a WiFi communication subsystem, etc.), and/or any other communication components known in the art. While a specific switch device 300 has been described, one of skill in the art in possession of the present disclosure will recognize that switch devices may include a variety of other components and/or component configurations in order to provide conventional switch device functionality, as well as the functionality discussed below, while remaining within the scope of the present disclosure.

Figure 4:
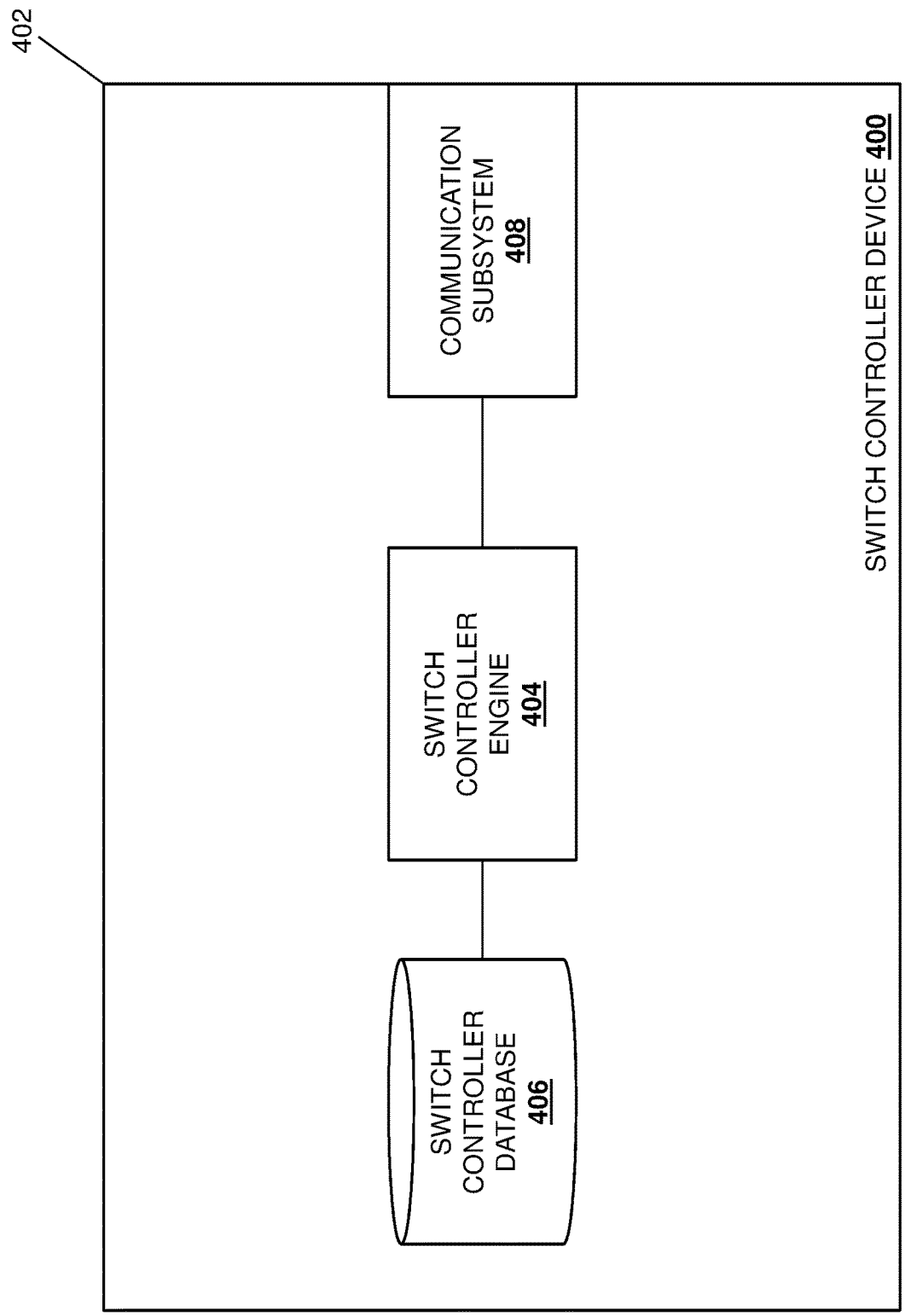
FIG. 4 is a schematic view illustrating an embodiment of a switch controller device included in the multicasting network of FIGS. 2A and 2B.

Referring now to FIG. 4, an embodiment of a switch controller device 400 is illustrated which may provide switch controller device 210 referenced in FIG. 2B above. As such, the switch controller device 400 may be the IHS 100 discussed above with reference to FIG. 1 and/or may include some or all of the components of the IHS 100, and in specific embodiments may be provided by an SDN controller device. In the illustrated embodiment, the switch controller device 400 includes a chassis 402 that houses the components of the switch controller device 400, only some of which are illustrated in FIG. 4. For example, the chassis 402 may house a processing system (not illustrated, but which may include the processor 102 discussed above with reference to FIG. 1), and a memory system (not illustrated, but which may include the memory 114 discussed above with reference to FIG. 1) that is coupled to the processing system and that includes instructions that, when executed by the processing system, cause the processing system to provide a switch controller engine 404 that may be configured to perform the functionality of any of the switch controller engines and/or switch controller devices discussed below.

The chassis 402 may also house a storage system (not illustrated, but which may include the storage device 108 discussed above with reference to FIG. 1) that is coupled to the switch controller engine 404 (e.g., via a coupling between the storage system and the processing system) and that includes a switch controller database 406 that may store any of the information utilized to provide the functionality discussed below. The chassis 402 may also house a communication subsystem 408 that is coupled to the switch controller engine 404 (e.g., via a coupling between the communication subsystem 408 and the processing system) and that may include a Network Interface Controller (NIC), a wireless communication subsystem (e.g., a BLUETOOTH communication subsystem, a Near Field Communication (NFC) subsystem, a WiFi communication subsystem, etc.), and/or any other communication components known in the art. While a specific switch controller device 400 has been described, one of skill in the art in possession of the present disclosure will recognize that switch controller devices may include a variety of other components and/or component configurations in order to provide conventional switch controller device functionality, as well as the functionality discussed below, while remaining within the scope of the present disclosure.

Figure 5:
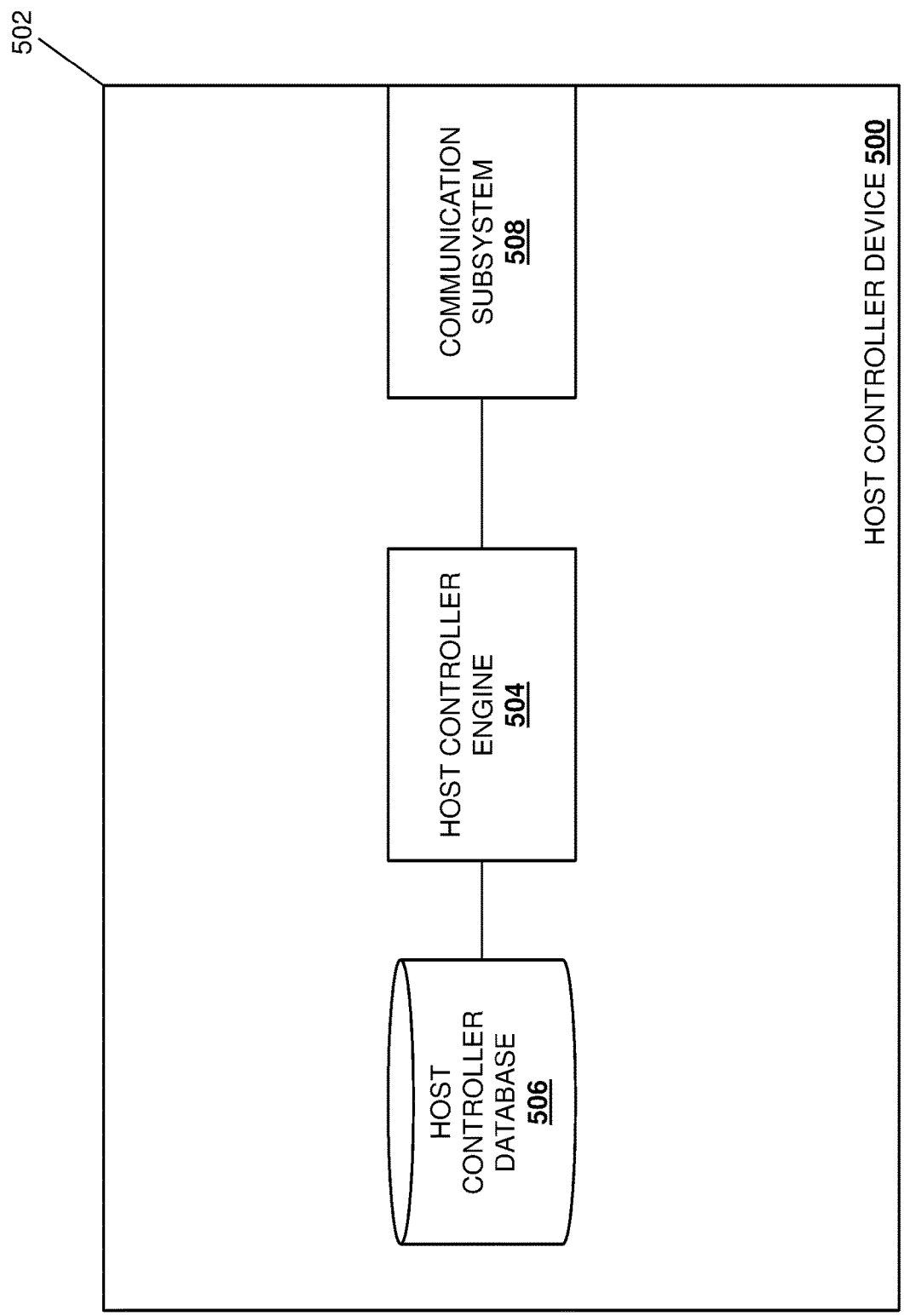
FIG. 5 is a schematic view illustrating an embodiment of a host controller device included in the multicasting network of FIGS. 2A and 2B.

Referring now to FIG. 5, an embodiment of a host controller device 500 is illustrated which may provide host controller device 212 referenced in FIG. 2B above. As such, the host controller device 500 may be the IHS 100 discussed above with reference to FIG. 1 and/or may include some or all of the components of the IHS 100, and in specific embodiments may be provided by a VM management system. In the illustrated embodiment, the host controller device 500 includes a chassis 502 that houses the components of the host controller device 500, only some of which are illustrated in FIG. 5. For example, the chassis 502 may house a processing system (not illustrated, but which may include the processor 102 discussed above with reference to FIG. 1), and a memory system (not illustrated, but which may include the memory 114 discussed above with reference to FIG. 1) that is coupled to the processing system and that includes instructions that, when executed by the processing system, cause the processing system to provide a host controller engine 504 that may be configured to perform the functionality of any of the host controller engines and/or host controller devices discussed below.

The chassis 502 may also house a storage system (not illustrated, but which may include the storage device 108 discussed above with reference to FIG. 1) that is coupled to the host controller engine 504 (e.g., via a coupling between the storage system and the processing system) and that includes a host controller database 506 that may store any of the information utilized to provide the functionality discussed below. The chassis 502 may also house a communication subsystem 508 that is coupled to the host controller engine 504 (e.g., via a coupling between the communication subsystem 508 and the processing system) and that may include a Network Interface Controller (NIC), a wireless communication subsystem (e.g., a BLUETOOTH communication subsystem, a Near Field Communication (NFC) subsystem, a WiFi communication subsystem, etc.), and/or any other communication components known in the art. While a specific host controller device 500 has been described, one of skill in the art in possession of the present disclosure will recognize that host controller devices may include a variety of other components and/or component configurations in order to provide conventional host controller device functionality, as well as the functionality discussed below, while remaining within the scope of the present disclosure.

Figure 6:
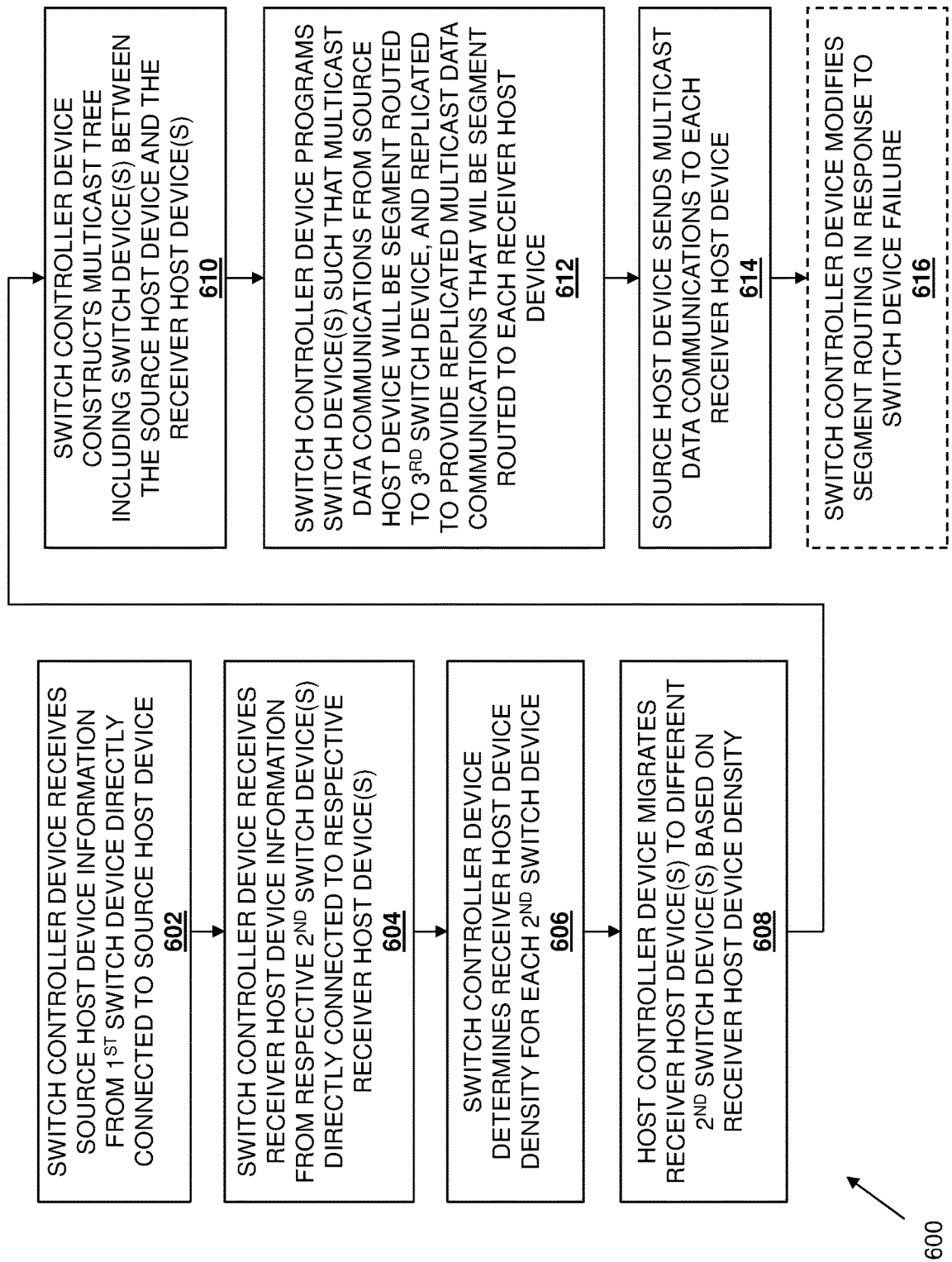
FIG. 6 is a flow chart illustrating an embodiment of a method for providing for multicasting.

Referring now to FIG. 6, an embodiment of a method 600 for providing multicasting is illustrated. As discussed below, the systems and methods of the present disclosure provide for multicasting in a network without the need for complex PIM techniques that require a multicast state in each of the switch devices that transmit multicast data communications between a source host device and receiver host devices. As discussed below, in some embodiments, such multicasting may be accomplished by an SDN controller that receives source host VM information about the source host VM that is to provide the multicast data communications, as well as receiver host VM information about any receiver host VMs that are to receive the multicast data communications. Using the receiver host VM information, the SDN controller may determine a receiver host VM density for each TOR switch that is directly connected to those receiver host VMs, and cause a host migration device to migrate at least one of the receiver host VMs to different directly connected TOR switches based on that receiver host VM density, which may provide the receiver host VMs that are to receive the multicast data communications directly connected to fewer TOR switches. The SDN controller may then construct a multicast tree that includes the switches (e.g., TOR switches, leaf switches, spine switches, etc.) between the source host VM and the receiver host VMs), and program a subset of those switches such that multicast data communications from the source host VM are segment routed via the switches to a spine switch, replicated by the spine switch, and then segment routed by the switches to each receiver host VM. As discussed in further detail below, this allows the source host VM to multicast data communications to receiver host VMs without the complexity of the PIM protocol and while utilizing less bandwidth than networks that implement PIM, at least in part via a migration of the receiver host devices/VMs based on the receiver host device/VM density of each of those TOR switch devices prior to the migration such that the receiver host devices/VMs are provided under as few TOR switch devices as possible.

Figure 7A:
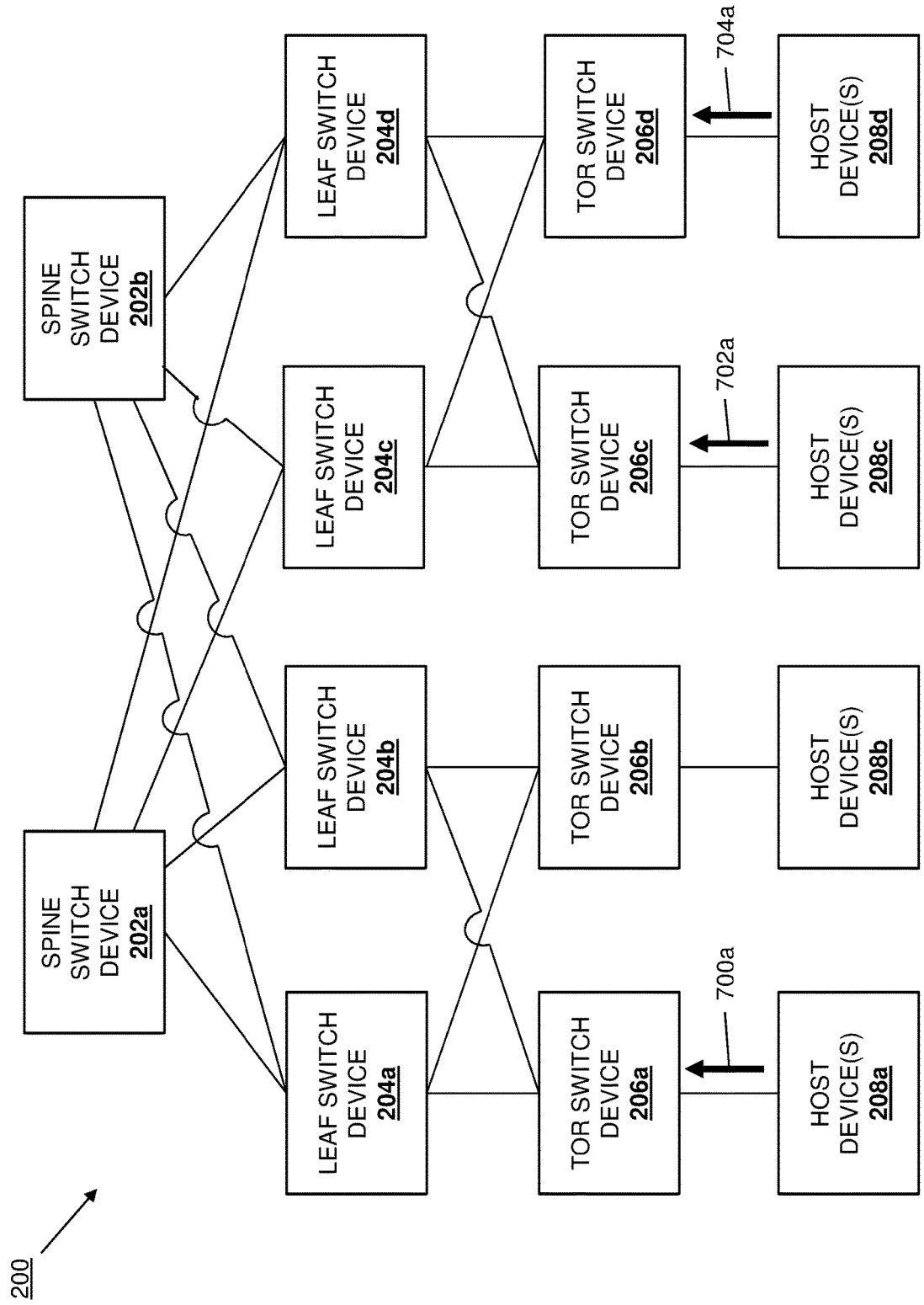
FIG. 7A is a schematic view illustrating an embodiment of communications used to build a multicast tree in the multicast network of FIG. 2A.

The method 600 begins at block 602 where a switch controller device receives source host device information for a source host device from a first switch device that is directly connected to that source host device. In an embodiment, at block 602, the switch controller engine 404 in the switch controller device 210/400 may receive (e.g., via the communication subsystem 408) source host device information from one of the TOR switch devices 206a-d. In the example illustrated and discussed below, a host device 208a directly connected to the TOR switch device 206a is the source host device, but one of skill in the art in possession of the present disclosure will recognize that any of the host devices 208a-d may be a source host device while remaining within the scope of the present disclosure. With reference to the example illustrated in FIG. 7A, at or prior to block 602, the source host device 208a may send a message 700a to the switch engine 304 in the TOR switch device 206a/300 (e.g., via the communication subsystem 308) that indicates that the TOR switch device 206a is directly connected to the source host device 208a that wishes to provide multicast data communications.

Figure 7B:
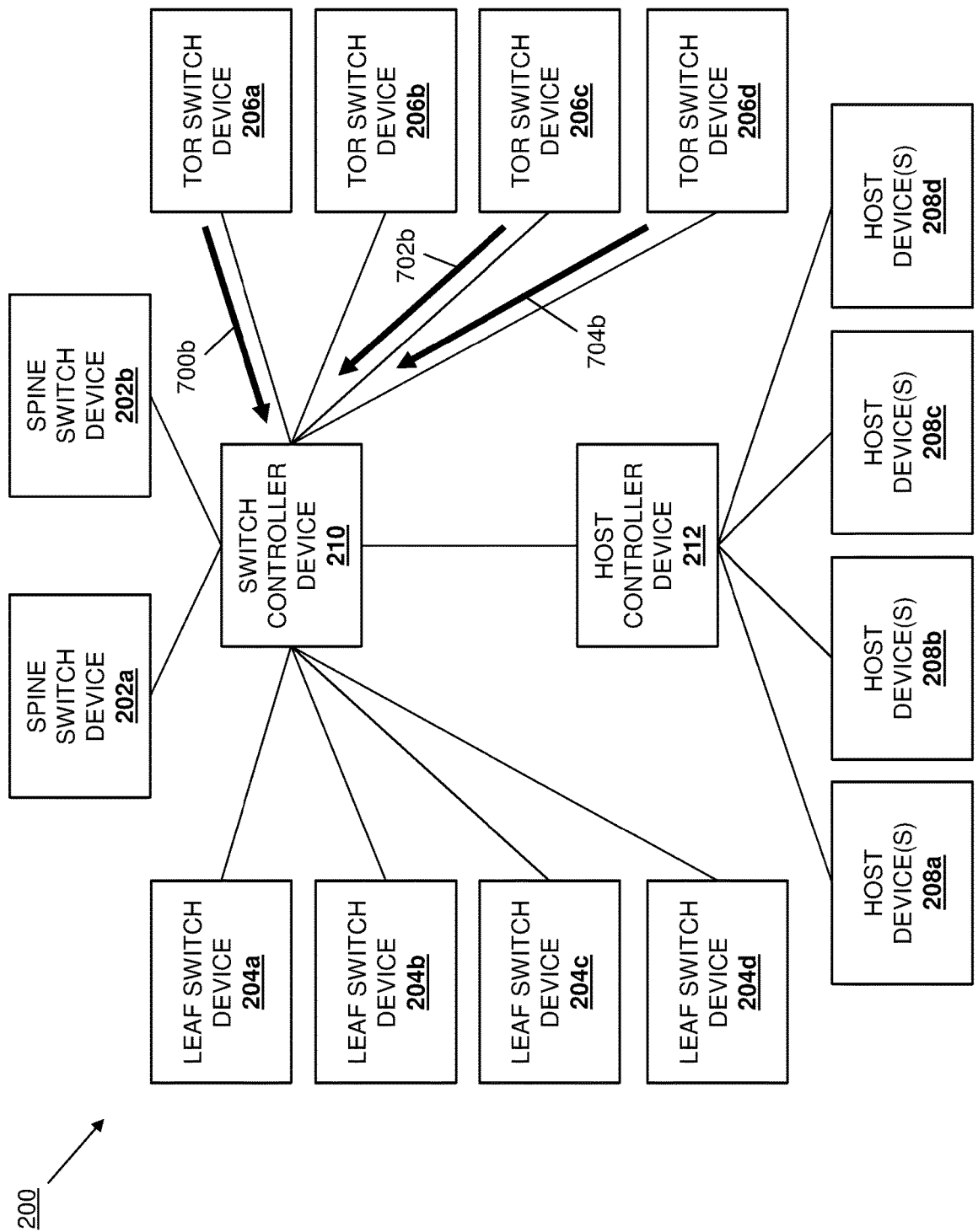
FIG. 7B is a schematic view illustrating an embodiment of communications used to build a multicast tree in the multicast network of FIG. 2B.

In a specific embodiment, a new/modified Internet Group Management Protocol (IGMP) message may be defined in order to convey this source host device information to between the source host device 208a and the TOR switch device 206a. For example, IGMPv2/IGMPv3 messages may be formatted to carry a new type and value that indicates a source host device/VMs IP address, along with a multicast group address to which the source host device/VM may send multicast data communications, which indicates to the switch controller device 210 that a source host device/VM exists behind the TOR switch device that received and provided those IGMP messages to the switch controller device 210. However, one of skill in the art in possession of the present disclosure will recognize that other techniques for conveying such information may fall within the scope of the present disclosure as well. With reference to FIG. 7B, in response to receiving the source host device information, the switch engine 304 in the TOR switch device 206a/300 may provide that source host device information to the switch controller device 210 (e.g., via the communication subsystem 308) using a communication 700b. For example, the source host device information may be conveyed to the switch controller device 210 as SRC-INFO.

The method 600 then proceeds to block 604 where the switch controller device receives receiver host device information for receive host device(s) from respective second switch devices that are directed connected to those receiver host device(s). In an embodiment, at block 604, the switch controller engine 404 in the switch controller device 210/400 may receive (e.g., via the communication subsystem 408) receiver host device information from one or more of the TOR switch devices 206a-d. In the example illustrated and discussed below, host devices 208c and 208d directly connected to the TOR switch devices 206c and 206d, respectively, are the receiver host devices, but one of skill in the art in possession of the present disclosure will recognize that any of the host devices 208a-d may be a receiver host device while remaining within the scope of the present disclosure. With reference to the example illustrated in FIG. 7A, at or prior to block 604, the receiver host device 208c may send a message 702a to the switch engine 304 in the TOR switch device 206c/300 (e.g., via the communication subsystem 308) that indicates that the TOR switch device 206c is directly connected to the receiver host device 208c that wishes to join a multicast group in order to receive multicast data communications (e.g., from the source host device 208a), and the receiver host device 208d may send a message 704a to the switch engine 304 in the TOR switch device 206d/300 (e.g., via the communication subsystem 308) that indicates that the TOR switch device 206d is directly connected to the receiver host device 208d that wishes to join a multicast group to receive multicast data communications (e.g., from the source host device 208a.)

In a specific embodiment, IGMP join communications may be utilized by the receiver host devices 208c and 208d to convey the receiver host device information to the TOR switch device 206c and 206d, respectively, although other techniques for conveying such information may fall within the scope of the present disclosure as well. In response to receiving the IGMP join communications, the switch engines 304 in the TOR switch devices 206c and 206d may install an entry (e.g., a *,G entry) in their respective data planes (e.g., via the switch databases 306). With reference to FIG. 7B, in response to receiving the receiver host device information, the switch engine 304 in the TOR switch device 206c/300 may provide that receiver host device information to the switch controller device 210 (e.g., via the communication subsystem 308) using a communication 702b, and the switch engine 304 in the TOR switch device 206d/300 may provide that receiver host device information to the switch controller device 210 (e.g., via the communication subsystem 308) using a communication 704b. For example, the receiver host device information may be conveyed to the switch controller device 210 as RCV-INFO.

In response to receiving the receiver host device information, the switch controller engine 404 in the switch controller device 210/400 may store any or all of the receiver host device information (e.g., in the switch controller database 406) that may include, for example, a source host device identifier such as a source host device Internet Protocol address (SRC IP), a multicast group Internet Protocol address (GRP IP), Media Access Control (MAC) addresses for the receiver devices (MAC ADDR), and/or any other information that would be apparent to one of skill in the art in possession of the present disclosure. As will be appreciated by one of skill in the art in possession of the present disclosure, the MAC addresses of the receiver devices may be stored and not used by the systems and methods of the present disclosure for forwarding multicast data communications, with such multicast data communications instead being forwarded using a MAC address associated with the multicast group IP address that may be derived via multicast rules. As such, blocks 602 and 604 of the method 600 allow for receiver host devices to subscribe to a multicast group via the receiver host device information that is provided to the switch controller device 210, and a source host device to provide a request to send multicast data communications to that multicast group via the source host device information that is provided to the switch controller device 210.

The method 600 then proceeds to block 606 where the switch controller device determines a receiver host device density for each second switch device. In an embodiment, at block 606, the switch controller engine 404 in the switch controller device 210/400 may utilize the receiver host device information, as well as any other information available to the switch controller device (e.g., information collected using conventional SDN techniques), to determine the number of receiver host devices that are directly connected to each TOR switch device (referred to below as a "receiver host device density"). While the example illustrated and described herein includes a pair of receiver host devices directly connected to respective TOR switch devices, one of skill in the art will recognize that many receiver host devices may be connected to a single TOR switch device, and many TOR switch devices may be connected to at least one receiver device. As such, at block 606, the switch controller engine 404 in the switch controller device 210/400 may identify each receiver host device that has attempted to subscribe to the multicast group that will receive multicast data communications from the source host device 208a, identify the TOR switch devices directly connected to those receiver host devices, and determine a number of the receiver host device(s) directly connected to each of those TOR switch devices.

The method 600 then proceeds to block 608 where a host controller device migrates receiver host device(s) to different second switch device(s) based on the receiver host device density. In an embodiment, at or prior to block 608, the switch controller engine 404 and/or switch controller database 406 in the switch controller device 210/400 may be configured to cause the switch controller engine 404 to attempt to maximize the receiver host device density for TOR switch devices without exceeding TOR switch device thresholds associated with providing multicast data communications to directly connected receiver host devices. For example, each TOR switch device may be associated with an available bandwidth (and/or other network characteristics) that defines a receiver host device limit on the number of directly connected receiver host devices to which it may transmit multicast data communications, and the switch controller engine 404 in the switch controller device 210/400 may retrieve/receive that information and use it along with the receiver host device density determined at block 606 to identify TOR switch devices with relatively high receiver host device density (e.g., a receiver host device density above, at, or near their receiver host device limit) and TOR switch devices with relatively low receiver host device density (e.g., a receiver host device density some predetermined amount below their receiver host device limit).

Based on identification of TOR switch devices with relatively high and low receiver host device densities, the switch controller engine 404 in the switch controller device 210/400 may operate with the host controller engine 504 in the host controller device 212/500 to cause a subset of the receiver host devices to be migrated within the multicast network 200 such that they become directly connected (e.g., provided by computing devices that are directly connected) to different TOR switch devices. As discussed above, the receiver host devices may be provided by receiver host VMs, and one of skill in the art in possession of the present disclosure will recognize how VM migration techniques may be utilized to perform the migration at block 608. In an embodiment, the switch controller engine 404 in the switch controller device 210/400 and/or the host controller engine 504 in the host controller device 212/500 may utilize bin packing algorithms to migrate some subset of the receiver host devices to different TOR switch devices such that the receiver host device density is decreased in some TOR switch devices (e.g., when the number of directly connected receiver host devices exceeds the receiver host device limit for the TOR switch device), the receiver host device density is increased in some TOR switch devices (e.g., when the number of directly connected receiver host devices is below the receiver host device limit for the TOR switch device), some TOR switch devices are no longer directly connected to receiver host devices, some TOR switch devices become connected to receiver host devices, etc.

Following block 608, the receiver host devices may be directly connected to a smaller number of TOR switch devices (i.e., relative to prior to the migration) while ensuring that the receiver host device limit (and/or other TOR switch device thresholds) in any of the TOR switch devices directly connected to receiver host devices in not exceeded. As such, multicast networks with a relatively high number of TOR switch devices may be configured at block 608 to only utilize a relatively small subset of those TOR switch devices for the multicasting described herein, while multicast networks with a relatively low number of TOR switch devices may utilize each those TOR switch devices for the multicasting described herein while distributing the receiver host devices across the TOR switch devices so that the multicasting does not exceed the capabilities of those TOR switch devices.

In some embodiments, the migration of the subset of receiver host devices such that they are directly connected to different TOR switch devices may involve the "pruning" of IGMP join communications sent by those receiver host devices prior to the migration. For example, prior to being migrated to a different TOR switch device, receiver host devices may send IGMP leave communications to the TOR switch device from which they are being migrated. Furthermore, subsequent to the migration, the receiver host devices that have been migrated to different TOR switch devices may again utilize IGMP join communications to convey their receiver host device information via their new TOR switch device to the switch device controller 210 similarly as discussed above. However, in other embodiments, the TOR switch device that had the receiver host device migrated to it may initiate the transfer of the associated receiver host device information to the switch controller device 210.

The method 600 then proceeds to block 610 where the switch controller device constructs a multicast tree including switch devices between the source host device and the receiver host device(s). In an embodiment, at block 610, the switch controller engine 404 in the switch controller device 212/400 uses the source host device information (e.g., the SRC-INFO) and the receiver host device information (e.g., the RCVR-INFO) received at blocks 602 and 604 to construct a multicast tree for transmitting multicast data communications between the source host device 208a and the receiver host devices 208c and 208d. For example, the switch controller engine 404 in the switch controller device 212/400 may use some of the source host device information (e.g., related to the flow bandwidth associated with the multicast data communications) to perform connection-admission-control operations to identify the bandwidth required for the multicast data communications, and then use that information to select a multi-leaf tree path from the (source) TOR switch device 206a that is directly connected to the source host device 208a to the (destination) TOR switch devices 208c and 208d that are directly connected to the receiver host devices 208c and 208d, respectively. One of skill in the art in possession of the present disclosure will appreciate that the receiver host device information (e.g., bandwidth capabilities received in IGMP messages) may be utilized to ensure that each switch device selected to transmit the multicast data communications has sufficient bandwidth to do so.

In specific examples discussed below, Interior Gateway Protocols (IGPs) such as the Open Shortest Path First (OSPF) protocol and the Intermediate System-Intermediate System (ISIS) protocol may be deployed in the multicast network 200 with segment routing extensions, and the switch controller engine 404 in the switch controller device 212/400 may receive and utilize IGP updates in order to construct the multicast tree at block 610. In embodiments where Border Gateway Protocols (BGPs) are used, BGP updates may be utilized at block 610 as well. With reference to the example illustrated in FIG. 8 and discussed in further detail below, the multicast tree constructed at block 610 includes a first path from the source host device 208a, through the TOR switch device 206a and the leaf switch device 204a, and to the spine switch device 202a. Furthermore, that multicast tree also includes a second path from the spine switch device 202a, through the leaf switch devices 204c and the TOR switch device 206c, and to the receiver host device 208c; as well as a third path from the spine switch device 202a, through the leaf switch devices 204d and the TOR switch device 206d, and to the receiver host device 208d.

The method 600 then proceeds to block 612 where the switch controller device programs switch device(s) such that multicast data communications from the source host device will be segment routed to a third switch device, and replicated to provide replicated multicast data communications that will be segment routed to each of the receiver host device(s). In an embodiment, at block 612, the switch controller engine 404 in the switch controller device 212/400 may operate to program the data planes in the switch devices (e.g., via the switch database(s) 306) that are part of the multicast tree constructed at block 610. For example, at block 612, the switch controller engine 404 in the switch controller device 212/400 may program those switch devices to utilize segment routing with Multi-Protocol Label Switching (MPLS) labels. As would be understood by one of skill in the art in possession of the present disclosure, most commercial silicon includes a limit of up to three MPLS labels, and embodiments of this example program the data plane in two stages. With reference to the specific example provided below, in the first stage the first path (from the source host device 208a, through the TOR switch device 206a and the leaf switch device 204a, and to the spine switch device 202a) may be programmed utilizing a single two segment routing label stack of depth two. In the second stage, each of the second path (from the spine switch device 202a, through the leaf switch devices 204c and the TOR switch device 206c, and to the receiver host device 208c) and the third path (from the spine switch device 202a, through the leaf switch devices 204d and the TOR switch device 206d, and to the receiver host device 208d) may be programmed utilizing a two segment routing label stack of depth two.

To provide a specific example of the method 600, at block 602 the source host device 208a may indicate a desire to its TOR switch device 206a to provide multicast data communications (e.g., a multicast stream) to a multicast group (e.g., G1) subscribed to by receiver host devices 208c and 208d at block 604. At block 610, the switch controller engine 404 in the switch controller device 212/400 utilizes the identities of the receiver host devices 208c and 208d to construct the multicast tree (e.g., via Interior Gateway Protocol Segment Routing (IGP-SG) routes) that identifies the TOR switch devices 206c and 206d along the optimal paths to the receiver host devices 208c and 208d, respectively. The switch controller engine 404 in the switch controller device 212/400 will also identify the spine switch device 202a along the optimal path to reach the TOR switch devices 206c and 206d, and will provide the TOR switch device 206a (which is directly connected to the source host device 208a) with a two segment routing label stack that identifies the leaf switch device 204a (e.g., with a label of 18001) and the spine switch device 202a (e.g., with a label of 20001).

The switch controller engine 404 in the switch controller device 212/400 will also program the spine switch device 202a to replicate multicast data communications received via the TOR switch device 206a from the source host device 208a, and provide the spine switch device 202a with a pair of two segment routing label stacks, each of depth two, to reach the TOR switch devices 206c and 206d associated with the multicast group (e.g., G1) that includes the receiver host devices 208c and 208d: a two segment routing label stack that identifies the leaf switch device 204c (e.g., with a label of 18003) and the TOR switch device 206c (e.g., with a label of 16003), and a two segment routing label stack that identifies the leaf switch device 204d (e.g., with a label of 18004) and the TOR switch device 206d (e.g., with a label of 16004).

Figure 8:
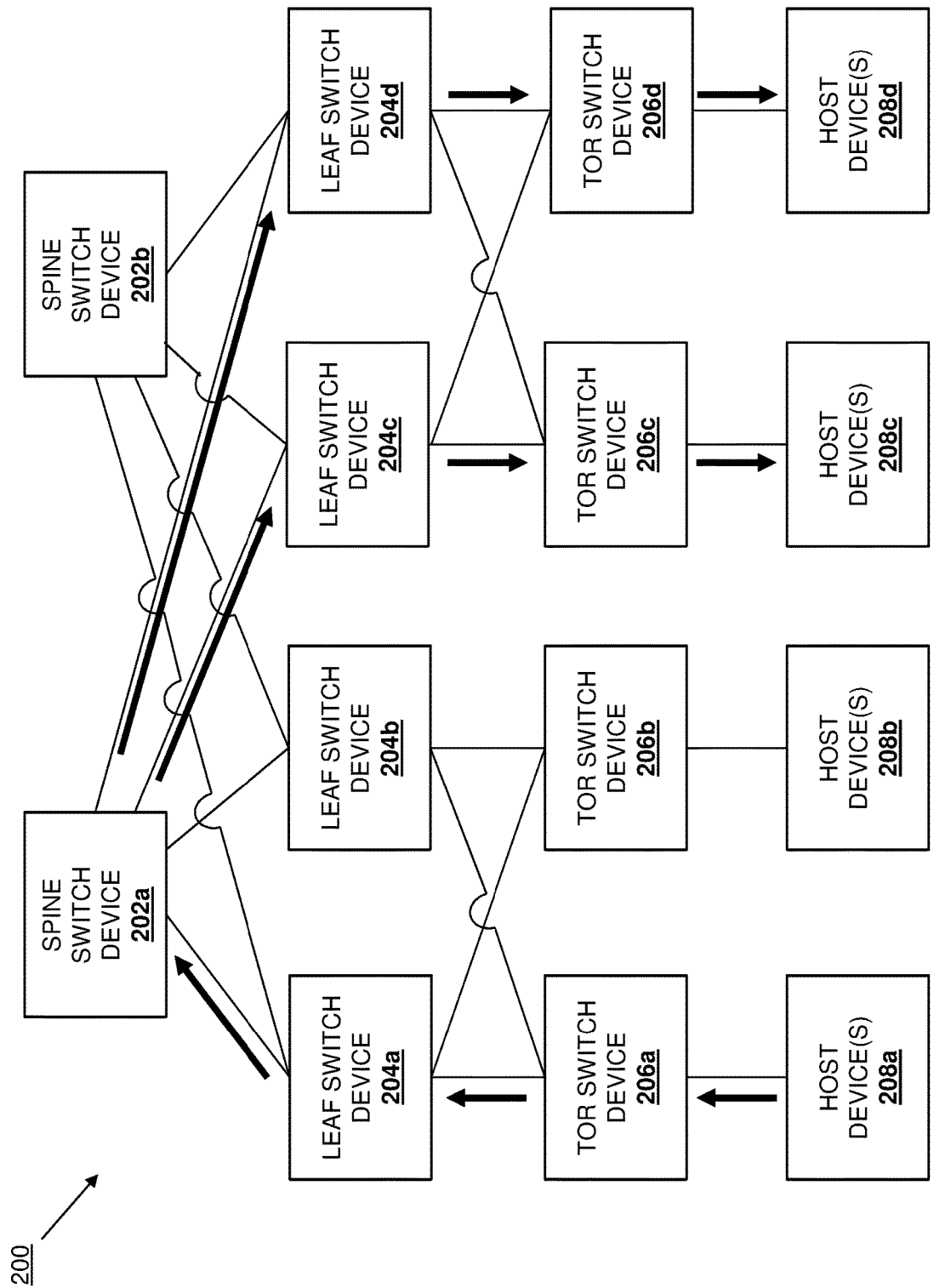
FIG. 8 is a schematic view illustrating an embodiment of the transmission of a multicast communication in the multicast network of FIG. 2A

One of skill in the art in possession of the present disclosure will recognize that the example illustrated in FIG. 8 is greatly simplified via the use of a single spine switch device 202a. In a non-illustrated example, a TOR switch device connected to a source host device may be programmed at block 612 to replicate a multicast data communication received from a source host device, and forward that replicated multicast data communication to multiple spine switch devices. Each of those spine switch devices may then be programmed to replicate any multicast data communication received from those TOR switch devices (i.e., if that spine switch device is forwarding the multicast data communication to more than one TOR switch device directly connected to a receiver host device), and each forward the multicast data communications to TOR switch devices directly connected to one or more receiver host devices.

In a specific example in which two spine switch devices are utilized, a TOR switch device may be programmed to forward multicast data communications received from a source host device to the pair of spine switch devices by programming the data plane in that TOR switch device with a pair of two segment routing label stacks: a two segment routing label stack that directs multicast data communications replicated by the TOR switch device to a first spine switch device, and a two segment routing label stack that directs multicast data communications replicated by the TOR switch device to a second spine switch device. Furthermore, any of those spine switch devices may be programmed to replicate the multicast data communication received from the TOR devices if necessary (i.e., if those multicast data communications are being forward by that spine switch device to more than one TOR switch device directly connected to a receiver host device), and programmed with two segment routing label stacks that enable the forwarding of those replicated multicast data communications to the TOR switch device(s) directly connected to the receiver host devices. In such multi-spine switch device embodiments, the multicast IP address in the spine switch device may be programmed with the label stacks that are used to reach the TOR switch devices directly connected to the receiver host devices.

The method 600 then proceeds to block 614 where the source host device sends multicast data communications to each of receiver host device(s). In an embodiment, at block 614, multicast data communications generated by the source host device 208a are forwarded through the multicast network 200 to the receiver host devices 208c and 208d by the switch devices programmed at block 212. With reference to FIG. 8, the source host device 208a may generate a multicast data communication (e.g., multicast data packets) that identify the multicast group (e.g., G1) that includes receiver host devices 208c and 208d, and transmit that multicast data communication to the TOR switch device 206a. The switch engine 304 in the TOR switch device 206a/300 may receive that multicast data communication (e.g., via the communication subsystem 308) and use the identified multicast group (e.g., G1) to retrieve (e.g., via its switch database 306) the two segment routing label stack that identifies the leaf switch device 204a (e.g., with a label of 18001) and the spine switch device 202a (e.g., with a label of 20001). The switch engine 304 in the TOR switch device 206a/300 may then add those labels to the multicast data communications, and forward the multicast data communication to the leaf switch device 204a based on its label (e.g., 18001). The switch engine 304 in the leaf switch device 204a will then receive the multicast data communication (e.g., via its communication subsystem 308), remove its label (e.g., 18001) from the multicast data communication, and forward the multicast data communication to the spine switch device 202a based on its label (e.g., 20001). One of skill in the art in possession of the present disclosure will recognize that only one copy of the multicast data communication is sent from the TOR switch device 206a to the spine switch device 202a in the example of FIG. 8, as opposed to the multiple copies of such a multicast data communication that would be sent in conventional multicast systems that utilize source replication by the source host device.

The switch engine 304 in the spine switch device 202a may receive that multicast data communication (e.g., via the communication subsystem 308) and use the identified multicast group (e.g., G1) to retrieve (e.g., via its switch database 306) the two segment routing label stack that identifies the leaf switch device 204c (e.g., with a label of 18003) and the TOR switch device 206c (e.g., with a label of 16003) directly connected to the receiver host device 208c, as well as retrieve the two segment routing label stack that identifies the leaf switch device 204d (e.g., with a label of 18004) and the TOR switch device 206d (e.g., with a label of 16004) directly connected to the receiver host device 208d. The switch engine 304 in the spine switch device 202a will then remove its label (e.g., 20001) from the multicast data communication, replicate the multicast data communication, provide a first replicated multicast data communication with the two segment routing label stack that identifies the leaf switch device 204c (e.g., with a label of 18003) and the TOR switch device 206c (e.g., with a label of 16003), and provide a second replicated multicast data communication with the two segment routing label stack that identifies the leaf switch device 204d (e.g., with a label of 18004) and the TOR switch device 206d (e.g., with a label of 16004).

The switch engine 304 in the spine switch device 202a then forwards the first replicated multicast data communication to the leaf switch device 204c based on its label (e.g., 18003)), and forwards the second replicated multicast data communication to the leaf switch device 204d based on its label (e.g., 18004). The switch engine 304 in the leaf switch device 204c will then receive the first replicated multicast data communication (e.g., via its communication subsystem 308), remove its label (e.g., 18003) from the first replicated multicast data communication, and forward the first replicated multicast data communication to the TOR switch device 206c based on its label (e.g., 16003). Similarly, the switch engine 304 in the leaf switch device 204d will then receive the second replicated multicast data communication (e.g., via its communication subsystem 308), remove its label (e.g., 18004) from the second replicated multicast data communication, and forward the second replicated multicast data communication to the TOR switch device 206d based on its label (e.g., 16004). Each of the TOR switch devices 206c and 206d may then forward their respective replicated multicast data communications to their directly connected receiver host devices 208c and 208d. In embodiments in which there are multiple receiver host devices directly connected to a TOR switch device, that TOR switch device may then perform multicast replication based on IGMP states (e.g., *,G states), and provide those replicated multicast data communications to its respective receiver host devices. One of skill in the art in possession of the present disclosure will recognize that replication of the multicast data communication in the systems and methods of the present disclosure may begin at the spine switch device 202a in the example of FIG. 8, as opposed to the replication of multicast data communications that is performed in conventional multicast systems at the source host device.

In some embodiments, the migration of the receiver host devices at block 608 may be performed such that the TOR switch devices that are directly connected to the receiver host devices are "consecutive" and/or reachable from the same spine switch device (or as few spine switch devices as possible) in order to localize the bandwidth utilized for a particular multicast tree to a particular portion in the multicast network. Furthermore, such localization provides for efficiencies in label stack generation. For example, when TOR switch devices are consecutive, with a first TOR switch device (TOR1) and a second TOR switch device (TOR 2) reachable from a first spine switch device, and a third TOR switch device (TOR3) reachable from a second spine switch device, consecutive label stacks may be generated for the first spine switch device (e.g., [AGG-RTR1, TOR1] and [AGG-RTR2, TOR2]) and the second spine switch device (e.g., [AGG-RTR3, TOR3]), with AGG-RTRx referring to the leaf switch devices in this context and topology.

The method 600 may then proceed to optional block 616 where the switch controller device modifies the segment routing in response to a switch device failure. In an embodiment, at block 616, any of the switch devices that transmit multicast data communications between the source host device and receiver host devices may fail or otherwise become unavailable. In response, the switch controller engine 404 in the switch controller device 210/400 operates to modify the segment routing performed by at least one of the available switch devices to provide a backup path for those multicast data communications. In one specific example of a failure in the multicast network 200 of FIG. 8, the leaf switch device 204a may become unavailable. In response, the switch controller engine 404 in the switch controller device 210/400 will notify (via its communication subsystem 408) the TOR switch device 206a of a backup path via a segment routing label stack of depth one that includes the label for the spine switch device 202a (e.g., 20001). When the switch engine 304 in the TOR switch device 206a/300 determines that the leaf switch device 204a is unavailable, it will forward multicast data communications received from the source host device 208a using that segment routing label stack of depth one (e.g., with label 20001, rather than using the segment routing label stack of depth two that includes the labels 18001 and 20001 that were used prior to the failure), and the leaf switch device that receives those multicast data communications (i.e., the leaf switch device 204b in this example) will forward them to the spine switch device 202a based on that segment routing label stack and a determination of the shortest path to the spine switch device 202a.

In another specific example of a failure in the multicast network 200 of FIG. 8, the spine switch device 202a may become unavailable. In response, the switch controller engine 404 in the switch controller device 210/400 will notify (via its communication subsystem 408) the TOR switch device 206a of a backup path via a segment routing label stack of depth one that includes an anycast label (e.g., A1) that is shared by each of the spine switch devices in the multicast network 200 (e.g., spine switches 202a and 202b in this example). When the switch engine 304 in the TOR switch device 206a/300 determines that the spine switch device 202a is unavailable, it will forward multicast data communications received from the source host device 208a using that segment routing label stack of depth one (e.g., with label A1, rather than using the segment routing label stack of depth two that includes the labels 18001 and/or 20001 that were used prior to the failure), and the leaf switch device 204a will forward them to the spine switch device 202b based on that segment routing label stack and a determination of the shortest path to the spine switch device 202b.

In another specific example of a failure in the multicast network 200 of FIG. 8, the leaf switch device 206c may become unavailable. In response, the switch controller engine 404 in the switch controller device 210/400 will notify (via its communication subsystem 408) the spine switch device 202a of a backup path via a segment routing label stack of depth one that includes the label for the TOR switch device 206c (e.g., 16003). When the switch engine 304 in the spine switch device 202a/300 determines that the leaf switch device 204c is unavailable, it will forward multicast data communications received from the source host device 208a using that segment routing label stack of depth one (e.g., with the label 16003, rather than using the segment routing label stack depth two that includes the labels 18003 and 16003 that were used prior to the failure), and the leaf switch device that receives those multicast data communications (i.e., the leaf switch device 204d in this example) will forward them to the TOR switch device 202c based on that segment routing label stack and a determination of the shortest path to the TOR switch device 202c.

While a few specific examples of failure scenarios have been illustrated. One of skill in the art in possession of the present disclosure will recognize that a variety of switch device failure situations may be dealt with in a similar manner using the teachings of the present disclosure. Furthermore, one of skill in the art in possession of the present disclosure will appreciate that the segment routing label stacks of depth two discussed above provide for strict source routing through specific aggregate layer switch devices, while the segment routing label stacks of depth one allow the switch devices to route over any aggregate layer switch that can reach the spine switch device and/or destination TOR switch device and is directly connected to the receiver host device (i.e., and that is associated with the only label included in the segment routing label stack). Furthermore, the switch controller device 210 may be updated about switch device failures via IGP updates, and may recompute the segment routing label stacks and provide them to switch devices as discussed above whenever a switch device failure or unavailability occurs.

Furthermore, in examples in which the migration of the receiver host devices at block 608 is performed such that the TOR switch devices that are directly connected to the receiver host devices are consecutive, segment routing label stack modification is simplified as well. Using the example provided above in which consecutive label stacks were generated for the first spine switch device (e.g., [AGG-RTR1, TOR1] and [AGG-RTR2, TOR2]) and the second spine switch device (e.g., [AGG-RTR3, TOR3]) prior to a failure of a leaf switch device between the spine switch devices and the TOR switch devices, the failure of any of those leaf switch devices may cause the labels to be modified as discussed above for the first spine switch device (e.g., with labels [TOR1] and [TOR2]) and the second spine switch device (e.g., with label [TOR3]). In such a situation, the first spine switch device will replicate a multicast data communication received from the source host device 208a and send each replicated multicast data communication using those labels to the TOR switch devices (TOR1 and TOR2), and the second spine switch device will send the multicast data communication using the label to the TOR switch device (TOR3).

In some embodiments, for any of the multicast data communications discussed above, one of skill in the art in possession of the present disclosure will recognize that the data plane in any of the switch devices may utilize IP in IP encapsulation with an inner packet being the multicast data communications packet and the outer packet being unicast from the source host device to the spine switch device, and/or from the spine switch device to the TOR switch device. In such embodiments, the outer packet may utilize the MPLS labels/headers discussed above. Furthermore, other techniques such as, for example, the use of a new ethertype to indicate a new type of packet for forwarding such multicast packets using segment routing based MPLS labels/headers, may be utilized as well.

Thus, systems and methods have been described that provide for multicasting in a network without the need for complex PIM techniques that require a multicast state in each of the switch devices that transmit multicast data communications between a source host device and receiver host devices. Such multicasting may be accomplished by a switch controller that receives source host device information about the source host device that is to provide the multicast data communications, as well as receiver host device information about any receiver host devices that are to receive the multicast data communications. Using the receiver host device information, the switch controller may determine a receiver host device density for each directly connected switch device that is directly connected to those receiver host devices, and cause a host migration device to migrate receiver host device(s) to different directly connected switch devices based on that receiver host device density, which provides the receiver host devices that are to receive the multicast data communications directly connected to fewer directly connected switch devices. The switch controller device may then construct a multicast tree that includes the switch devices between the source host device and the receiver host devices), and program a subset of those switch devices such that multicast data communications from the source host device are segment routed via the switch devices to a spine switch device, replicated by the spine switch device, and then segment routed by the switch devices to each receiver host device.

As will be appreciated by one of skill in the art in possession of the present disclosure, no PIM protocol operations are required to provide for multicasting using the teachings of the present disclosure. Rather, the switch controller device need only listen to IGP or BGP updates, and build a topology and multicast trees using connection-admission-control operations in order to ensure proper bandwidth for the multicast flows. Furthermore, the migration operations provides for the utilization of fewer directly connected (e.g., TOR) switch devices in multicast data communications, which leads to the need to generate fewer label stacks. Further still, the systems and methods of the present disclosure provide for quick and efficient switch device failure/unavailability re-routing, utilizes label stacks with depths that are compliant with conventional merchant silicon, and may reduce the bandwidth necessary for multicasting (e.g., due to the multicast data communication replication performed at spine switch devices rather than at the source host device or TOR switch devices.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multicast system, comprising:
a source host device;
a plurality of receiver host devices;
a plurality of switch devices coupled between the source host device and each of the plurality of receiver host devices; and
a switch controller device that is coupled to each of the plurality of switch devices, wherein the switch controller device is configured to:
receive, from a first switch device that is included in the plurality of switch devices and that is directly connected to the source host device, source host device information that was communicated by the source host device to the first switch device;
receive, from respective second switch devices that are included in the plurality of switch devices and that are each directly connected to a respective one of the plurality of receiver host devices, receiver host device information that was communicated by each respective receiver host device to its respective directly connected second switch device;
cause, based on a receiver host density for each of the second switch devices, a migration of a migration subset of the plurality of receiver host devices to provide the migration subset of the plurality of receiver host devices directly connected to different ones of the second switch devices;
construct, using the source host device information and each of the receiver host device information, a multicast tree that includes a multicast subset of the plurality of switch devices that are capable of transmitting multicast communications from the source host device to each of the plurality of receiver host devices; and
programming at least one of the multicast subset of the plurality of switch devices such that a multicast data communication generated by the source host device is segment routed by at least some of the multicast subset of the plurality of switch devices to a third switch device that is included in the multicast subset of the plurality of switch devices, and replicated by the third switch device to produce replicated multicast data communications that are each segment routed by at least some of the multicast subset of the plurality of switch devices to at least some of the plurality of receiver host devices through their respective second switch devices, wherein the replication that produces the replicated multicast data communications begins at the third switch device and not the source host device or any of the switch devices included in the multicast subset of the plurality of switch devices between the source host device and the third switch device.

2. The system of claim 1, further comprising:
a host controller device that is coupled to each of the source host device and the plurality of receiver host devices, wherein the host controller is device is configured to migrate the migration subset of the plurality of receiver host devices, and wherein the switch controller device is configured to:
determine, based on the source host device information and each of the receiver host device information, the receiver host device density for each of the second switch devices.

3. The system of claim 2, wherein the switch controller device is configured to:
receive, from each of the different ones of the second switch devices to which the migration subset of the plurality of receiver host devices was directly connected, updated receiver device information that was communicated by each respective receiver host device in the migration subset to its respective directly connected different one of the second switch devices.

4. The system of claim 1, wherein the segment routing of the multicast data communication and the replicated multicast data communications is performed using MultiProtocol Label Switching (MPLS) labels.

5. The system of claim 4, wherein the switch controller device is configured to:
determine that one of the multicast subset of the plurality of switch devices has become unavailable; and
modify the depth of the MPLS label used by the third switch device to cause the replicated multicast data communications to be segment routed around the one of the multicast subset of the plurality of switch devices that has become unavailable.

6. The system of claim 1, wherein the first switch device and the plurality of second switch devices are each Top-Of-Rack (TOR) switch devices, and wherein the third switch device is a spine switch device.

7. An Information Handling System (IHS), comprising:
a processing system; and
a memory system that is coupled to the processing system and that includes instructions that, when executed by the processing system, cause the processing system to provide a switch controller engine that is configured to:

receive, from a first switch device that is directly connected to a source host device, source host device information that was communicated by the source host device to the first switch device;

receive, from respective second switch devices that are each directly connected to a respective one of a plurality of receiver host devices, receiver host device information that was communicated by each respective receiver host device to its respective directly connected second switch device;

cause, based on a receiver host density determined for each of the second switch devices, a migration of a migration subset of the plurality of receiver host devices to provide the migration subset of the plurality of receiver host devices directly connected to different ones of the second switch devices construct, using the source host device information and each of the receiver host device information, a multicast tree that includes a plurality of switch devices that include the first switch device and the second switch device, and that are capable of transmitting multicast communications between the source host device and each of the plurality of receiver host devices; and programming at least one of the plurality of switch devices such that a multicast data communication generated by the source host device is segment routed by at least some of the plurality of switch devices to a third switch device that is included in the plurality of switch devices, and replicated by the third switch device to produce replicated multicast data communications that are each segment routed by at least some of the plurality of switch devices to at least some of the plurality of receiver host devices through their respective second switch devices, wherein the replication that produces the replicated multicast data communications begins at the third switch device and not the source host device or any of the switch devices included in the multicast subset of the plurality of switch devices between the source host device and the third switch device.

8. The IHS of claim 7, wherein the switch controller engine is configured to:

determine, based on the source host device information and each of the receiver host device information, the receiver host device density for each of the second switch devices.

9. The IHS of claim 8, wherein the switch controller engine is configured to:

receive, from each of the different ones of the second switch devices to which the migration subset of the plurality of receiver host devices was directly connected, updated receiver device information that was communicated by each respective receiver host device in the migration subset to its respective directly connected different one of the second switch devices.

10. The IHS of claim 7, wherein the segment routing of the multicast data communication and the replicated multicast data communications is performed using MultiProtocol Label Switching (MPLS) labels.

11. The IHS of claim 10, wherein the switch controller engine is configured to:

determine that one of the plurality of switch devices has become unavailable; and modify the depth of the MPLS label used by the third switch device to cause the replicated multicast data communications to be segment routed around the one of the plurality of switch devices that has become unavailable.

12. The IHS of claim 7, wherein the first switch device and the plurality of second switch devices are each Top-Of-Rack (TOR) switch devices.

13. The IHS of claim 7, wherein the third switch device is a spine switch device, and wherein at least one of the plurality of switch devices is a leaf switch device.

14. A method for multicasting, comprising:

receiving, by a switch controller device from a first switch device that is directly connected to a source host device, source host device information that was communicated by the source host device to the first switch device;

receiving, by the switch controller device from respective second switch devices that are each directly connected to a respective one of a plurality of receiver host devices, receiver host device information that was communicated by each respective receiver host device to its respective directly connected second switch device;

causing, by the switch controller device based on a receiver host density determined for each of the second switch devices, a migration of a migration subset of the plurality of receiver host devices to provide the migration subset of the plurality of receiver host devices directly connected to different ones of the second switch devices;

construct, by the switch controller device using the source host device information and each of the receiver host device information, a multicast tree that includes a plurality of switch devices that include the first switch device and the second switch device, and that are capable of transmitting multicast communications between the source host device and each of the plurality of receiver host devices; and programming, by the switch controller device, at least one of the plurality of switch devices such that a multicast data communication generated by the source host device is segment routed by at least some of the plurality of switch devices to a third switch device that is included in the plurality of switch devices, and replicated by the third switch device to produce replicated multicast data communications that are each segment routed by at least some of the plurality of switch devices to at least some of the plurality of receiver host devices through their respective second switch devices, wherein the replication that produces the replicated multicast data communications begins at the third switch device and not the source host device or any of the switch devices included in the multicast subset of the plurality of switch devices between the source host device and the third switch device.

15. The method of claim 14, further comprising:

determining, by the switch controller device based on the source host device information and each of the receiver host device information, the receiver host device density for each of the second switch devices.

16. The method of claim 15, further comprising:

receiving, by the switch controller device from each of the different ones of the second switch devices to which the migration subset of the plurality of receiver host devices was directly connected, updated receiver device information that was communicated by each respective receiver host device in the migration subset to its respective directly connected different one of the second switch devices.

17. The method of claim 14, wherein the segment routing of the multicast data communication and the replicated multicast data communications is performed using Multi-Protocol Label Switching (MPLS) labels.

18. The method of claim 17, further comprising:
determining, by the switch controller device, that one of the plurality of switch devices has become unavailable; and
modifying, by the switch controller device, the depth of the MPLS label used by the third switch device to cause the replicated multicast data communications to be segment routed around the one of the plurality of switch devices that has become unavailable.

19. The method of claim 14, wherein the first switch device and the plurality of second switch devices are each Top-Of-Rack (TOR) switch devices.

20. The method of claim 14, wherein the third switch device is a spine switch device, and wherein at least one of the plurality of switch devices is a leaf switch device.

\* \* \* \* \*